United States Patent [19]

Yamamoto et al.

[11] Patent Number: 4,768,430
[45] Date of Patent: Sep. 6, 1988

[54] COMPRESSION APPARATUS HAVING GROOVED COMPRESSION SLEEVE AND PRESS RAM

[75] Inventors: Kojuro Yamamoto, Inazawa; Katsutoshi Torita, Handa, both of Japan

[73] Assignee: NGK Insulators, Ltd., Aichi, Japan

[21] Appl. No.: 26,295

[22] Filed: Mar. 16, 1987

Related U.S. Application Data

[63] Continuation of Ser. No. 776,891, Sep. 17, 1985, abandoned.

[30] Foreign Application Priority Data

| Oct. 2, 1984 [JP] | Japan | 59-206565 |
| Jun. 20, 1985 [JP] | Japan | 60-133033 |
| Jun. 20, 1985 [JP] | Japan | 60-133034 |

[51] Int. Cl.$^4$ .................... B30B 7/00; B30B 15/04; G21F 9/36
[52] U.S. Cl. .................... 100/37; 100/193; 100/209; 100/246
[58] Field of Search ............ 100/41, 42, 295, 245, 100/902, 240, 214, 246, 229 R, 218, 179, 252, 193, 209; 252/626, 633

[56] References Cited

U.S. PATENT DOCUMENTS

| 3,405,744 | 10/1968 | Bowman | 100/246 X |
| 3,416,439 | 12/1968 | Tezuka | 100/246 X |
| 3,643,590 | 2/1972 | Aluotto | 100/246 X |
| 3,665,848 | 5/1972 | Kimura et al. | |
| 3,791,289 | 2/1974 | Lamorte et al. | |
| 3,854,397 | 12/1974 | Dempster | |
| 4,524,048 | 6/1985 | Schmidt et al. | |
| 4,631,015 | 12/1986 | Shigeo et al. | 100/246 |

FOREIGN PATENT DOCUMENTS

| 7282581 | 10/1982 | Australia. |
| 360140 | 9/1922 | Fed. Rep. of Germany. |
| 1577271 | 4/1970 | Fed. Rep. of Germany. |
| 2243136 | 7/1979 | Fed. Rep. of Germany. |
| 574671 | 3/1958 | Italy. |
| 6977 | 5/1922 | Netherlands. |
| 1122607 | 8/1968 | United Kingdom. |
| 1230014 | 4/1971 | United Kingdom. |

Primary Examiner—Andrew M. Falik
Attorney, Agent, or Firm—Parkhurst & Oliff

[57] ABSTRACT

A compression and volume reduction treatment apparatus for solid waste including a compression sleeve for receiving therein a cylindrical vessel filled with the solid waste and a press ram arranged above said compression sleeve movable upward and downward for compressing, at high pressure, the cylindrical vessel in the compression sleeve. The compression sleeve includes an upper straight large diameter portion, a lower straight small diameter portion and an intermediate tapered portion, thereby compressing the cylindrical vessel and reducing its volume in three dimensional directions by compressing the vessel radially inwardly at the tapered inner surface of the intermediate tapered portion and compressing axially at the inner surface of the lower straight small diameter portion when the cylindrical vessel in said upper straight large diameter portion is urged by said press ram in a uniaxial direction.

3 Claims, 3 Drawing Sheets

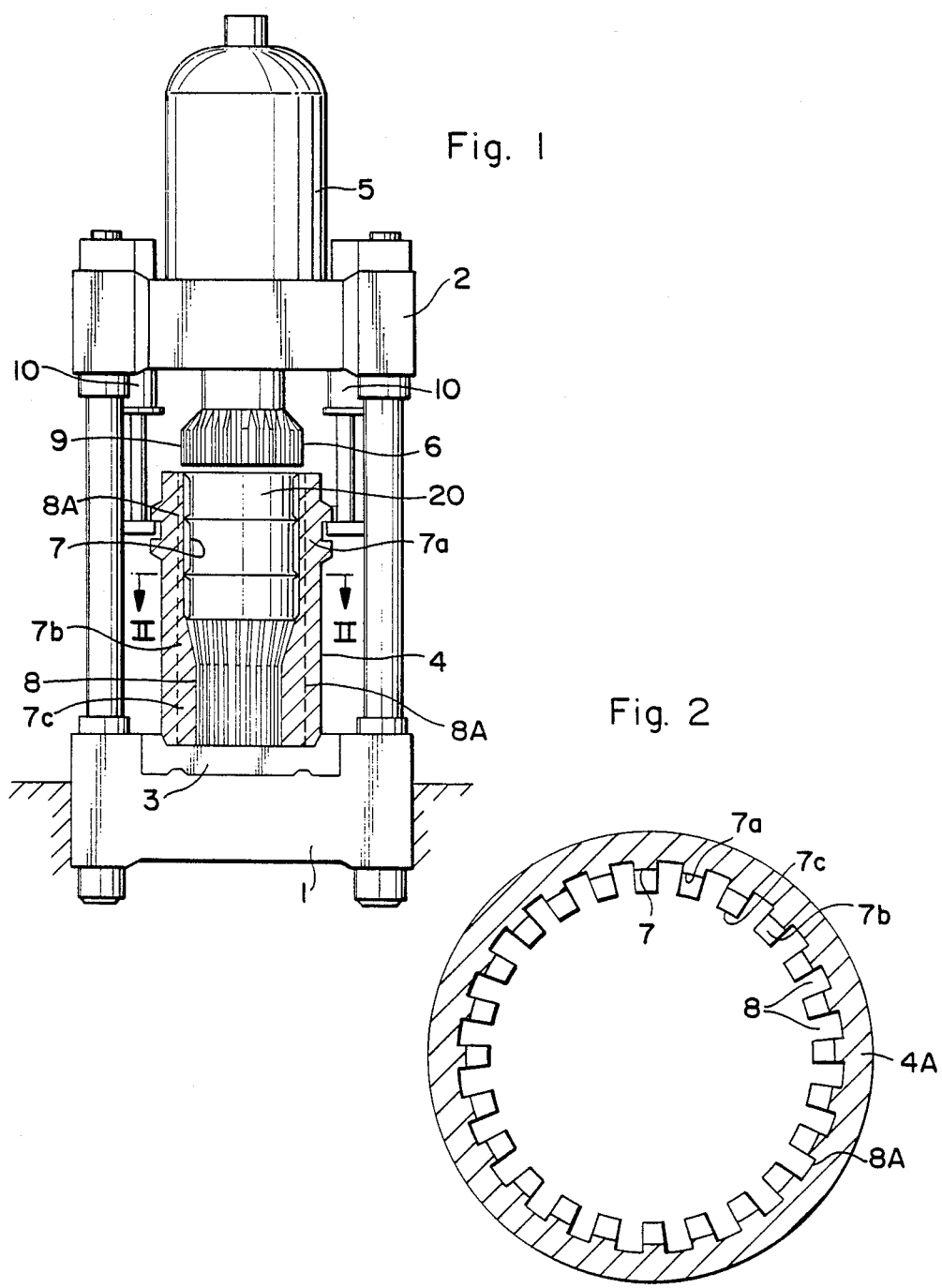

4,768,430

COMPRESSION APPARATUS HAVING GROOVED COMPRESSION SLEEVE AND PRESS RAM

RELATED APPLICATIONS

This application is a continuation of co-pending application Ser. No. 776,891, filed Sept. 17, 1985 abandoned.

BACKGROUND OF THE INVENTION

This invention relates to an apparatus for compressing vessels filled with miscellaneous combustible and incombustible solid waste so as to reduce their volume, and more particularly to an apparatus for pressing various solid waste packed into cylindrical vessels, for example, steel drums, so as to reduce their volume in three dimensional directions by uniaxial compression to form reduced volume compacted blocks.

In general, miscellaneous combustible and incombustible solid waste having various shapes and properties are treated by incineration or are compressed to form compacted blocks according to their properties and thereafter are used for reclamation or are again utilized if useful substances are included. Among this solid waste, however, there are some kinds of waste unavoidably stored in places or plants where they are produced because it is impossible to dispose of them, such waste being contaminated by radioactive materials derived from nuclear power installations such as nuclear power stations, nuclear power research installations, nuclear fuel treating installations, nuclear power reprocessing factories, radioisotope treating installations and the like (which will be referred to hereinafter as "radioactive waste"), and waste contaminated by poisonous or toxic substances derived from poisonous producing or treating processes (which will be referred to hereinafter as "poisonous waste"). In this case, they are usually packed and stored in cylindrical vessels such as steel drums in order to prevent the radioactive or posionous substances from spattering from the waste and to prevent spread of contemplated areas. As the stored amounts progressively increase, it has been effected to treat combustible waste to reduce their volume by burning them in certain installations, and particularly it has been carried out to compress incombustible waste to reduce their volume in certain plants, at last to start studying such processes for the purpose of saveing storage space.

Such a compression treatment for waste is the simplest process for reducing volume of the waste and has an advantage in that no secondary waste occurs in this process. In the compression treatment presently carried out in nuclear power stations and the like, after a cover of a steel drum is opened and waste is charged into the steel drum, the waste is compressed to reduce its volume by a press ram having a diameter slightly smaller than an inner diameter of the steel drum. With this processing, there is a risk of radioactive materials spattering to spread the contamination, and particularly, for waste having high restoring ability, the compressed waste is apt to increase again their volume has been reduced, so that the expected reduction in volume cannot be achieved.

Moreover, it has been proposed to compress waste together with steel drums filled therewith to reduce their volume. In this case, the steel drum filled with waste is compressed in a cylindrical sleeve in a uniaxial direction or in three dimensional directions. In the uniaxial compression, outer diameters of compressed waste and drums (referred to hereinafter "compressed blocks") are substantially equal to or larger than inner diameters of the original steel drums, so that a new vessel having a larger inner diameter is needed for storing the compressed blocks. This is a disadvantage of uniaxial compression. For example, it is required to prepare two kinds of steel drums having capacities of 180 and 200 l, respectively. In the three dimensional compression, on the other hand, although it does not have such a disadvantage, an apparatus for compression is complicated and bulky to increase the cost of equipment due to compression in the multiple directions.

SUMMARY OF THE INVENTION

It is a primary object of the invention to provide a compression and volume reduction treatment apparatus for solid waste, which eliminates all of the disadvantages of the prior art and which is capable of compressing the solid waste together with a cylindrical vessel accommodating therein the solid waste in three dimensional directions by a uniaxial compression to form a compressed block having a size capable of being stored in a cylindrical vessel having the same size as that of the cylindrical vessel before it is uniaxially compressed.

In order to achieve this object, in a compression and volume reduction treatment apparatus for solid waste including a compression sleeve for receiving therein a cylindrical vessel filled with the solid waste and a press ram arranged above said compression sleeve, which is displaceable upward and downward for compressing at high pressure the cylindrical vessel in the compression sleeve, according to the invention, the compression sleeve comprises an upper straight large diameter portion having a straight cylindrical inner surface, a lower straight small diameter portion having a straight cylindrical inner surface whose inner diameter is smaller than that of said upper straight large diameter portion, and an intermediate tapered portion whose inner surface is tapered downward to connect said straight cylindrical inner surface of said upper and lower portions, thereby compressing said cylindrical vessel and reducing its volume in three dimensional directions by compressing said vessel radially inwardly at the tapered inner surface of said intermediate tapered portion and compressing axially at said inner surface of said lower straight small diameter portion when the cylindrical vessel in said upper straight large diameter portion is urged by said press ram in a uniaxial direction.

The compression sleeve is preferably provided at its inner surfaces with a number of longitudinal grooves in its axial direction adapted to engage a number of ridges formed on an outer circumerential surface of the press ram. It is particularly preferable to form bottoms of the longitudinal grooves rectilinearly continuous from an upper end to a lower end of the compression sleeve.

It is another object of the invention to provide a compression and volume reduction treatment apparatus for solid waste which is capable of compressing a cylindrical vessel filled with solid waste to reduce its volume only by compression on one direction, thereby obtaining effective handling of waste storage vessels and discarded high efficiency particle air filters (HEPA filters).

It is a further object of the invention to provide a compression and volume reduction treatment apparatus for solid waste, whose overall height is made so low as to be installed in a narrow room, particularly a room with a low ceiling.

In order to accomplish these objects, according to the invention, the lower straight small diameter portion is made by a different part detachable from the upper straight larger diameter portion and the intermediate tapered portion integral therewith, and the apparatus comprises a pre-compression device having a pushing press ram for compressing the cylindrical vessel radially inwardly at the intermediate tapered portion into the lower straight small diameter portion and a main compression device in which the radially inwardly compressed cylindrical vessel is compressed axially in the lower straight small diameter portion transferred from the pre-compression device.

Moreover, the pre-compression device is provided on a base common to the main compression device, and a slide base is provided on the base enabling the lower straight small diameter portion to move between the pre-compression and main compression devices.

With this arrangement, prior to the compression and volume reduction by the main compression device, a cylindrical vessel or discarded high efficiency particle air filter having an outer diameter larger than an inner diameter of the lower straight small diameter portion is compresed into the lower straight small diameter portion with the aid of the pre-compression press ram and the upper straight large diameter portion and the intermediate tapered portion integral therewith in the pre-compression device, and thereafter the pre-compressed vessel is further compressed to reduce the volume. In this manner, the compressed block is smaller in external size or outer diameter than the original cylindrical vessel. Moreover, as the precompression device and the main compression device take partial charge of the compression in the compression sleeve, respectively, the overall height of the apparatus is lower than that of the prior art.

Furthermore, the compressed blocks may be quadrilateral-shaped or hexagonal-shaped in cross-section which can improve the storage efficiency for the compressed blocks.

BRIEF DESCRIPTION OF THE DRAWINGS

FIG. 1 is a partially cut away front elevation of a first embodimnt of the invention;

FIG. 2 is a sectional view taken along a line II—II in FIG. 1;

DESCRIPTION OF THE PREFRRED EMBODIMENTS

Figure 3:
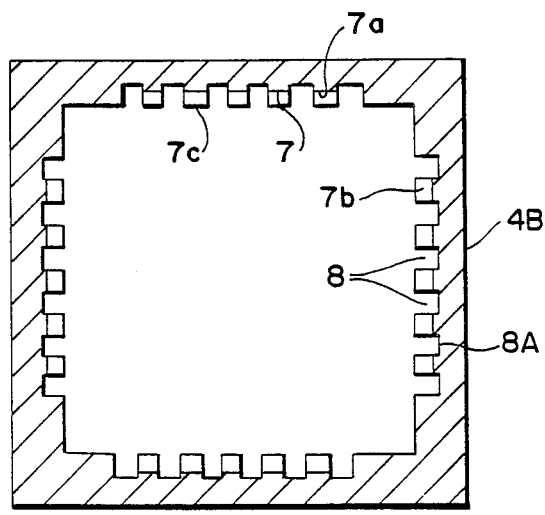
FIG. 3 is a sectional view of another embodiment taken along the line II—II in FIG. 1.
Figure 4:
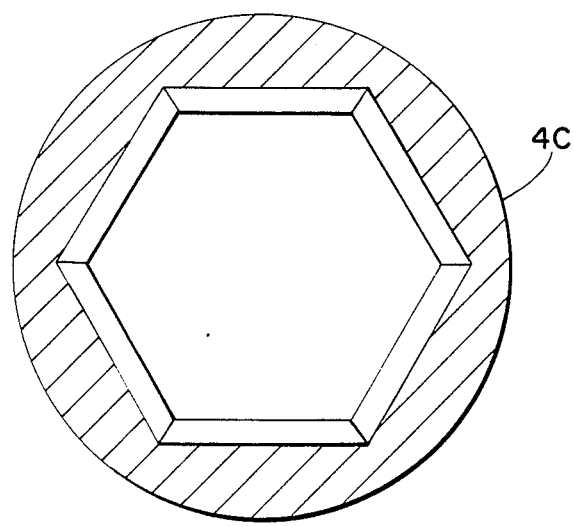
FIG. 4 is a sectional view of another embodiment taken along the line II—II in FIG. 1.

Referring to FIG. 1, which illustrates one embodiment of the apparatus according to the invention, it comprises a base 1, a frame 2 upright standing thereon, a slide base 3 centrally arranged slidably on an upper surface of the base 1, a compression sleeve 4 provided on the slide base 3, a hydraulic cylinder 5 having a maximum compressive force, of for example, 1,000 tons, provided on the frame 2, and a press ram 6 adapted to be driven by the hydraulic cylinder 5. The compression sleeve 4 for receiving therein a cylindrical vessel 20, such as a steel drum filled with solid waste, has an inner circumferential surface 7 and consists of an upper straight large diameter portion 7a having a straight cylindrical inner surface slightly larger than the cylindrical vessel 20, a lower straight small diameter portion 7c having a straight cylindrical inner surface of which the diameter is smaller than that of the cylindrical vessel 20, and an intermediate tapered portion 7b whose inner surface is tapered downward to connect the inner surfaces of the large and small diameter portions 7a and 7c, as shown in FIGS. 2, 3 and 4. The compression sleeve is further formed in its iinner circumferential surface 7 with a plurality of longitudinal grooves 8, rectilinearly continuous from its upper to lower end. These grooves 8 engage a plurality of ridges 9 formed on an outer circumferential surface of the press ram 6 to prevent any space from being formed between the press ram 6 and the inner circumferential surface 7 of the compression sleeve 4 in both the case of the lower end of the press ram 6 being positioned in the straight large diameter portion 7a and in the straight small diameter portion 7c. When the lower end of the press ram 6 is in the straight large diameter portion 7a, the ridges 9 engage the longitudinal grooves 8 so as to extend the edges of the ridges 9 only slightly into the grooves 8. However, when the lower end of the press ram 6 is in the intermediate tapered portion 7b at the lower straight small diameter portion 7c, the ridges 9 engage the longitudinal grooves 8 sufficiently deeper than when in the large diameter portion 7a. Thus, the ridges 9 and the longitudinal grooves 8 always engage each other to prevent clearance between the press ram 6 and the compression sleeve 4. For this purpose, therefore, bottoms 8A of the longitudinal grooves 8 of the compression sleeve 4 (the bottoms 8A being illustrated by the phantom lines in the compression sleeve 7 in FIG. 1) should be straight and parallel to an axis of the compression sleeve 4 and extending from the straight large diameter portion 7a to the straight small diameter portion 7c. Moreover, a diameter of bottoms of grooves formed between the ridges 9 of the press ram 6 should be small enough to be accommodated in the straight small diameter portion 7c of the compression sleeve 4. Although the longitudinal grooves 8 preferably extend from the upper end to the lower end of the inner circumferential surface 7 of the compression sleeve 4, the grooves in the straight large diameter portion 7a may be dispensed with. Furthermore, it is preferable for the compression sleeve 4 to be liftable when the compressed waste block is removed. In this embodiment, lifting means 10, having hydraulic cylinders, support the compression sleeve 4 so as to be freely raised and lowered.

With this arrangement, under a condition where the press ram 6 provided on the frame 2 is raised, the cylindrical vessel 20 filled with solid waste is located in the straight large diameter portion 7a of the compression sleeve 4. The compression sleeve 4, accommodating therein the cylindrical vessel 20, is brought into a position directly below the press ram 6 by moving the slide base 3 carrying thereon the compression sleeve 4. After the ridges 9 on the outer circumferential surface of the press ram 6 are brought into engagement with the longitudinal grooves 8 in the inner circumferential surface 7 of the compression sleeve 4, the press ram 6 is lowered so as to urge the cylindrical vessel 20, with the solid wastes therein, downward toward the intermediate tapered portion 7b of the compression sleeve 4. The cylindrical vessel with the solid waste is subjected to compressive forces radially inwardly toward a center axis of the cylindrical vessel to reduce its diameter during passing through the intermediate tapered portion. Thereafter, the cylindrical vessel with the solid waste arrives in the lower straight small diameter portion 7c of the compression sleeve 4, where they are finally pressed with high pressure by means of the press rams 6 to reduce their height to a fraction of the original height. In other words, the cylindrical vessel filled with solid waste is compressed to reduce its volume in three dimensional directions by vertically compressing it only in a uniaxial or single axial direction. Moreover, because of the number of longitudinal grooves 8 formed in the inner circumferential surface 7 of the compression sleeve 4 engaging the number of ridges 9 formed on the outer circumferential surface of the press ram 6 to prevent any clearance between them, the cylindrical vessel 20 is compressed so as to reduce its volume into the form of a disc without outward extending of the cylindrical vessel 20 and without bursting out and scattering of the solid waste.

Thereafter, while the press ram 6 is maintained in its compressing position, the compression sleeve 4 is lifted by means of the lifting means 10 to remove the compressed block downward relative to the compression sleeve 4. The compressed block is moved out of the apparatus with the aid of the slide base 3. As the compressed block has been compressed vertically to a fraction of its original height of the cylindrical vessel and radially inwardly by 10–20%, so that several blocks thus compressed can be accommodated in a cylindrical vessel having substantially the same dimensions as that of the original cylindrical vessel 20.

As can be seen from the above expanation, solid waste filled into a cylindrical vessel, such as a steel drum, are compressed radially and axially or vertically in three dimensional directions by compressing in a uniaxal direction so as to reduce the volume of the solid waste, thereby enabling blocks thus compressed to be accommodated in a vessel having substantially the same dimensions as that of the original vessel. As a result, solid waste can be treated without preparing cylindrical vessels of different sizes. Moreover, the press ram of the apparatus according to the invention requires a simple motion only in a uniaxial direction, so that the apparatus can use a simplified compresing mechanism so as to reduce the cost of the equipment. Moeover, the longitudinal grooves formed in the inner circumferential surface of the compression sleeve engage the ridges on the outer circumferential surface of the press ram so as to prevent outward extending of compressed block and bursting out and scattering of solid waste to ensure the reliable treatment for compressing and reducing in volume the solid waste.

The numeral 4A in FIG. 2 represents a cross section of the compression sleeve 4, as viewed from the line II—II in FIG. 1. The numeral 4B in FIG. 3 and 4C in FIG. 4 represent alternate cross-sections for the compression sleeve 4. When the cross sections shown in FIG. 3 and FIG. 4 are chosen, compressed blocks of solid waste can be formed in sizes smaller than polygons circumscribed to outer shapes of initial steel drums, thereby improving the storage efficiency of the compressed blocks.

Figure 5:
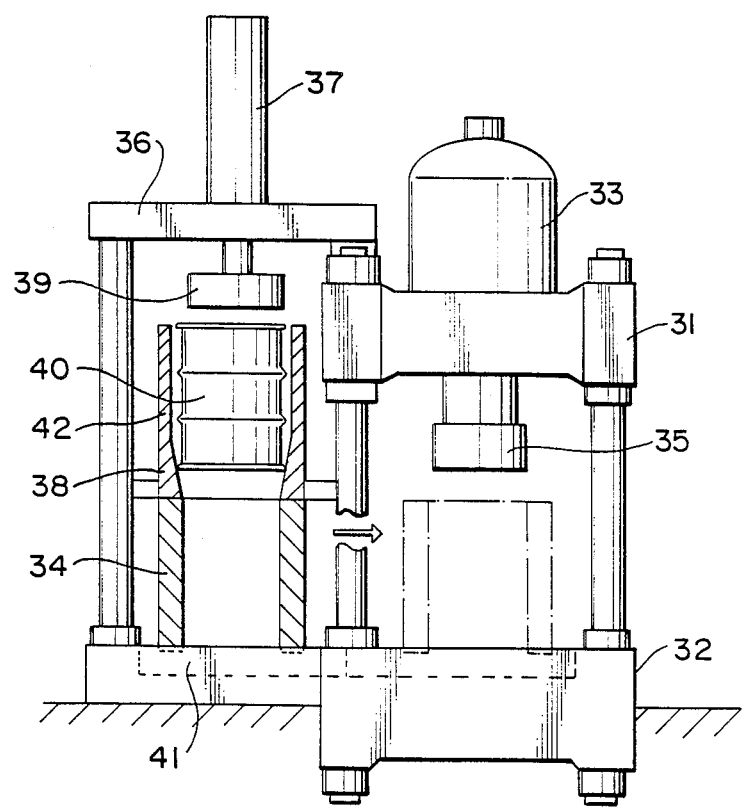
FIG. 5 is a partially cut away front elevation illustrating a further embodiment of the apparatus according to the invention.

FIG. 5 illustrates another embodiment of the apparatus according to the invention. a frame 31 is rigidly mounted on a base 32 for constituting a furthEr compression device. A hydraulic cylinder 33 having a maximum compressive force of, for example, 1,000 tons, is located on the frame 31. Onto a rod of the hydraulic cylinder 33 is mounted another main press ram 35 having an outer diamter engageable with a lower straight small diameter portion 34 of a compression sleeve. In order to construct a main compression device, on an extension of the base 32 is provided a pushing press frame 36 onto which are fixed a pushing hydraulic cylinder 37 and an upper straight large diameter portion 42 and an intermediate tapered portion 38 integral therewith as a part of a compression sleeve. Onto a rod of the hydraulic cylinder 37 is mounted a pushing press ram 39. The lower straight small diameter portion 34 has an inner diameter smaller than an outer diameter of a cylindrical vessel 40 to be filled with solid waste, while the upper straight large diameter portion 42 has an inner diameter enabling the cylindrical vessel 40 to be received therein. The intermediate tapered portion 38 has an inner surface tapered downward whose inner diameter at the lowermost end is equal to the inner diameter of the lower straight small diameter portion. A slide base 41 is centrally provided on the base 32 and the lower straight small diameter portion 34 is located on the slide base 41. By sliding the slide base 41 on the base 32, the lower straight small diameter portion 34 selectively assumes a position where it is in contact with the intermediate tapered portion 38 immediately below the pushing press ram 39 and a position where the small diameter portion 34 is immediately below the main press ram 35.

The procedure for actually carrying out the compression and volume reduction with the apparatus will be explained hereinafter. First, a vessel 40 must be loaded into the upper straight large diameter portion 42 and the lower straight small diamter portion 34 constituting the compression sleeve is moved to the pre-compression position where it is in contact with the intermediate tapered portion 38 in the pre-compression device as shown in FIG. 5. Then, the cylindrical vessel 40, arranged in the upper straight large diameter portion 42 and seated on the intermediate tapered portion 38, is forced into the lower straight small diameter portion 34 by means of the pushing press ram 39 driven by the hydraulic cylinder 37 while being compressed radially inwardly when passing through the intermediate tapered portion 38. After the pushing press ram 39 is then raised, the straight small diameter portion 34, including therein the cylindrical vessel 40, is brought into the compression position immediately below the main press ram 35 with the aid of the slide base 41. Thereafter, the main press ram 35 is lowered by the hydraulic cylinder 33 to further compress the cylindrical vessel 40 in the lower straight small diameter portion 34. To remove the compressed cylindrical vessel 40 from the lower straight small diameter portion 34 a lifting means (not shown) in the main compression device is actuated to raise the lower straight small diameter portion 34 while the main press ram 35 remains stationary, thus removing the compressed block from the main compression device. Alternatively, after the slide base 41 is slid together with the lower straight small diameter portion, including therein the compressed block, into the pre-compression device, the lower straight small diameter portion 34 is raised by means of lifters (not shown) and then the compressed block is pushed downward by the pushing press ram 39.

As can be seen from the above detailed description, with the compression and volume reduction treatment apparatus for solid wast according to the invention, the solid waste together with the cylindrical vessel filled therewith are compressed and reduced in volume in three dimensional directions by the compression only in a single direction without jamming the cylindrical vessel. A plurality of compressed blocks can be stored in a vessel, for example, a steel drum, which is substantially the same in size as the above mentioned cylindrical vessel to enable vessels for waste to be easily handled, because the compressed blocks of the waste are smaller in external size or outer diameter than cylindrical vessels.

A plurality of compressed blocks can be stored in, for example, a steel drum of 200 l. As shown in FIG. 5, the overall height of the apparatus can be made lower by dividing the compression sleeve, so that the apparatus can be advantageously installed in a narrow room, particularly a room with a low overhead ceiling.

While the invention has been shown and described with reference to the preferred embodiments, it will be understood that various changes and modifications can be made thereto without departing from the spirit and scope of the invention as defined in the appended claims.

Therefore, the apparatus according to the invention is very advantageous for compressing solid waste and the like and reducing their volume to treat the waste produced in nuclear power installations and greatly contributes to the development of the industry as a compression and volume reduction treatment apparatus for solid waste which eliminates all the disadvantages of the prior art.

What is claimed is:

1. A compression and volume reduction treatment apparatus for solid waste, comprising:
   a compression sleeve for receiving therein a cylindrical vessel filled with the solid waste, said compression sleeve having an interior surface comprising a straight large diameter portion having a straight cylindrical inner surface, a straight small diameter portion having a straight cylindrical inner surface with an inner diameter which is smaller than that of said straight large diameter portion and smaller than an outer diameter of the cylindrical vessel, and an intermediate tapered portion whose inner surface is tapered to connect said straight cylindrical inner surfaces of said straight large diameter portion and said straight small diameter portion, said inner surfaces of the large diameter portion, the straight diameter portion and the intermediate tapered portion including a plurality of axially aligned longitudinal grooves; and
   a press ram arranged above said compression sleeve such that it is upwardly and downwardly displaceable for compressing at high pressure the cylindrical vessel in the compression sleeve, said press ram having an outer circumferential surface that includes a plurality of axially aligned ridges engaging with said axially aligned longitudinal grooves of said large diameter portion, said small diameter portion and said intermediate tapered portion of the compression sleeve, thereby compressing said cylindrical vessel and reducing its volume in three dimensional directions by compressing said vessel radially inwardly at the tapered inner surface of said intermediate tapered portion and compressing axially at said inner surface of said straight small diameter portion when the cylindrical vessel in said straight large diameter portion is urged by said press ram in a uniaxial direction.

2. An apparatus as set forth in claim 1, wherein bottoms of said plurality of longitudinal grooves are rectilinearly continuous from an upper end to a lower end of said compression sleeve.

3. An apparatus as set forth in claim 1, wherein shapes of said press ram and of said interior surface of said compression sleeve are selected from the group of shapes consisting of circular, quadrilateral and hexagonal.

* * * * *